(No Model.)

F. SHOCK.
RIDING SADDLE.

No. 338,195. Patented Mar. 16, 1886.

Attest:
J. W. Hoke.
C. S. Biser

Inventor:
Floyd Shock
by C. D. Moody
atty

UNITED STATES PATENT OFFICE.

FLOYD SHOCK, OF WEATHERFORD, TEXAS, ASSIGNOR OF ONE-HALF TO GEORGE D. BARNARD, OF ST. LOUIS, MISSOURI.

RIDING-SADDLE.

SPECIFICATION forming part of Letters Patent No. 338,195, dated March 16, 1886.

Application filed January 12, 1886. Serial No. 188,290. (No model.)

*To all whom it may concern:*

Be it known that I, FLOYD SHOCK, of Weatherford, Parker county, Texas, have made a new and useful Improvement in Saddles, of which the following is a full, clear, and exact description.

The improvement consists in providing a riding-saddle with a compass, substantially as is represented in the annexed drawings, in which—

Figure 1:
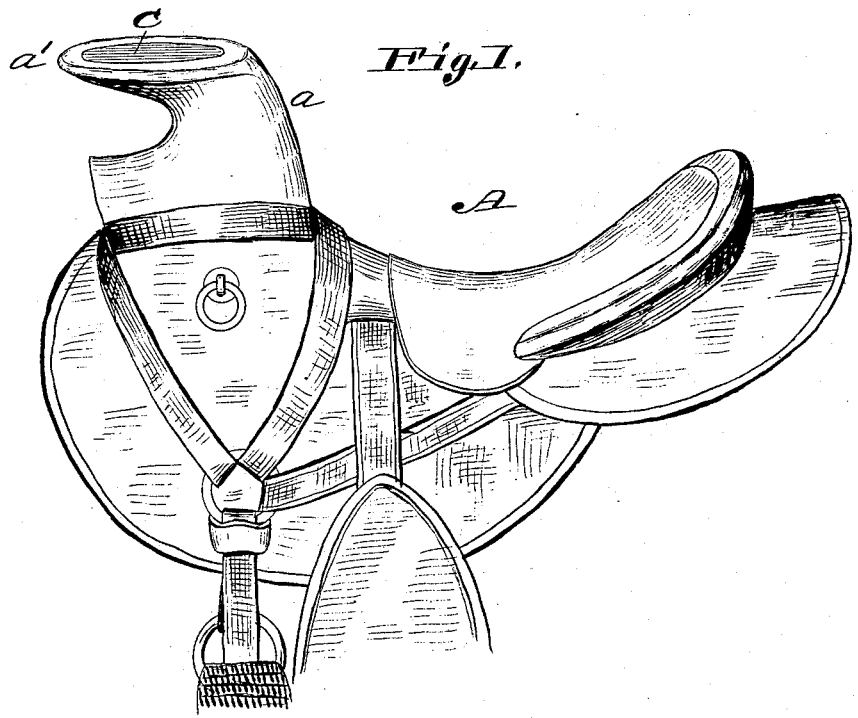
Figure 2:
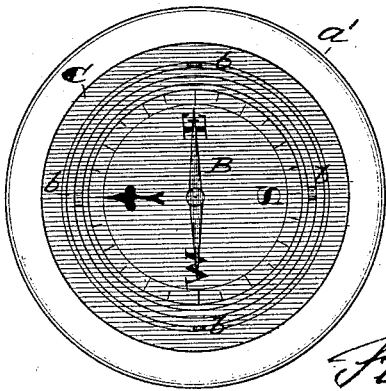

Figure 1 is a view in perspective of a saddle having the improvement, and Fig. 2 is a plan of the saddle-pommel, or "tree-fork," as it is sometimes termed.

The same letters of reference denote the same parts.

The improvement is designed more especially for riders having to traverse wide stretches of country—such as occur in Texas and the southwest and west, which are wanting in landmarks that are useful in guiding a traveler. To those employed in herding cattle it is particularly convenient, in that it supplies a means for directing their movements, and in such manner as not to be an interference in the discharge of their duties. At the same time the compass is so incorporated in the saddle as to be easily read, and also well guarded against injury.

The saddle, A, exhibited in the drawings is of a type much used in the regions referred to, having a high pommel, $a$, well extended at its top $a'$.

B, Fig. 2, represents a compass such as is used by mariners and surveyors. The upper end of the pommel is chambered out to receive the compass, which is inserted within the pommel, and suitably, as by means of a gimbal-joint, $b$, held therein, so that the compass shall be operative in all or nearly all the positions which a saddle while in use may assume. A piece of glass, C, or other transparent material through which the compass can be observed, is let into the pommel, so as to cover the compass and exclude moisture therefrom, and to impart a desirable finish to the structure. A cap (not shown) may be used to cover the pommel.

In the place of the glass C, some other suitable cap may be used to inclose the compass in the pommel.

I claim—

The combination of the saddle-pommel $a$, the compass B, and the glass C, substantially as described.

FLOYD SHOCK.

Witnesses:
C. D. MOODY,
J. M. RICHARDS.